United States Patent [19]

Robinson et al.

[11] 4,004,276
[45] Jan. 18, 1977

[54] TELEPHONE ANSWERING MACHINES

[75] Inventors: Stephen Perrin Robinson, Camberley; David Charles Evans, Woodley; Martin Hewitt, Church Crookham, all of England

[73] Assignee: Ansafone Limited, Camberley, England

[22] Filed: July 25, 1975

[21] Appl. No.: 598,938

[30] Foreign Application Priority Data

July 26, 1974 United Kingdom ............ 33228/74

[52] U.S. Cl. .................... 340/171 A; 340/171 PF; 340/151
[51] Int. Cl.² ......................................... H04Q 9/00
[58] Field of Search ..... 340/171 A, 171 R, 171 PF, 340/311, 312, 151; 325/492

[56] References Cited

UNITED STATES PATENTS

| | | | |
|---|---|---|---|
| 3,035,250 | 5/1962 | Durkee | 340/171 PF |
| 3,039,081 | 6/1962 | Smith | 340/171 PF |
| 3,060,408 | 10/1962 | Stewart | 340/171 PF |
| 3,092,829 | 6/1963 | Kleist | 340/312 |
| 3,588,826 | 6/1971 | Vaccaro | 340/171 PF |

*Primary Examiner*—Harold I. Pitts
*Attorney, Agent, or Firm*—Browdy and Neimark

[57] ABSTRACT

A remotely controllable electrical equipment is fitted with a decoder device associated with which is an unlocking circuit. Access to the electrical equipment is obtained by transmitting an access signal from a remote coder device. The access signal is made up of three groups of pulsed electrical signals, each group comprising two pulses of frequencies different from each other. The first group of pulses unlocks the unlocking circuit for a first predetermined interval of time. If the second group of pulses arrives within this first predetermined interval of time the unlocking circuit is unlocked for a second predetermined interval of time. If the third group of pulses arrives in the second predetermined interval of time an output signal is applied to the associated electrical equipment. Control signals for operating the equipment can then be transmitted from the coder device to the equipment via the decoder device.

14 Claims, 2 Drawing Figures

4,004,276

TELEPHONE ANSWERING MACHINES

BACKGROUND OF THE INVENTION

This invention relates to coder and decoder devices for use in remotely controlling electrical equipment.

The present invention includes a decoder device for remotely controllable electrical equipment, the device comprising a receiver adapted to supply a predetermined output signal only when a predetermined access signal is applied to an input thereof, the access signal comprising two groups of pulsed electrical signals, each group comprising two pulses each of a predetermined frequency different from the other, an unlocking circuit, and means for applying the output signal from the receiver to the unlocking circuit, the unlocking circuit being switched to an enabled condition for a predetermined interval of time after receipt of a first of the said groups and providing the said predetermined output signal if a second of the said groups is then received in the said predetermined interval of time.

The invention also includes a coder device for generating signals for use in remotely controlling electrical equipment, the device comprising oscillator means adapted, when a coded input voltage is applied thereto, to generate an electrical signal or electrical signals of frequency determined by the coding of the input voltage, means for generating coded input voltages for the oscillator means, and means coupling the generating means to the oscillator means, the generating means being adapted, when operated, to generate a predetermined sequence of coded input voltages, whereby the oscillator means generate an access signal for rendering the electrical equipment accessible to subsequent control signals and comprising two groups of pulsed electrical signals, each group comprising two pulses each of a predetermined frequency different from the other.

BRIEF DESCRIPTION OF THE DRAWINGS

The invention will now be described, by way of example, with reference to the accompanying drawings, in which.

DESCRIPTION OF THE PREFERRED EMBODIMENT

Figure 1:
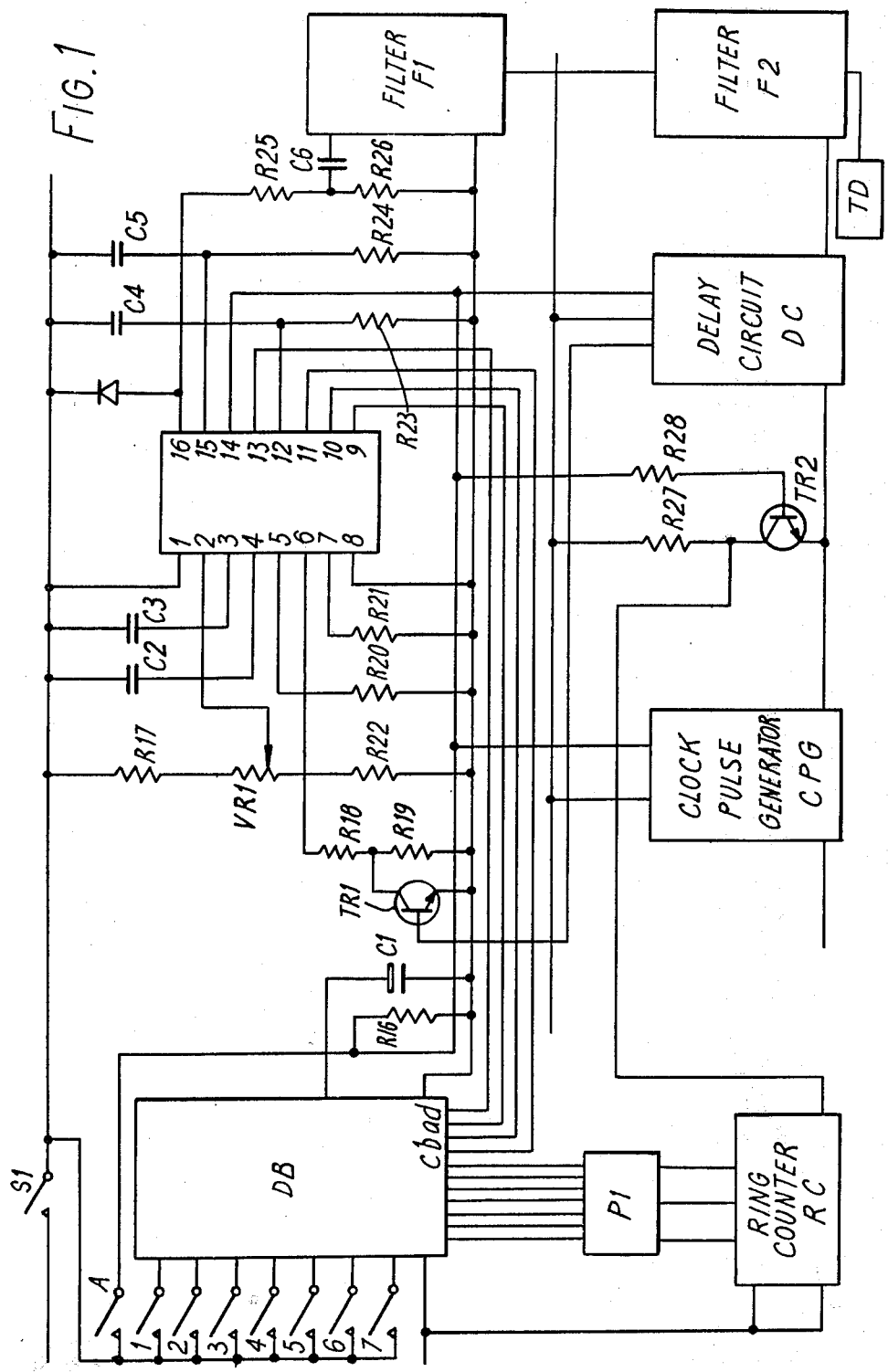
FIG. 1 is a coder device according to the invention for use in remotely controlling a telephone answering machine.

FIG. 1 of the drawings is a coder device for use in remotely controlling a telephone answering machine. The coder is used to transmit coded command signals which are then decoded by a decoder, shown in FIG. 2, which is included in the machine itself. From the decoder, voltages are applied to mechanisms for rewinding the tape, playing back recorded messages, driving the tape forwardly at high speed, etc. As a safeguard against improper use the decoder is normally latched so as to prevent access of the control signals. To obtain access it is first necessary to transmit a coded access signal from the coder device. The access signal unlatches the decoder, as hereinafter described.

Referring to FIG. 1, the coder device includes a transmitter TX in the form of an integrated circuit which is adapted to generate seven coded command signals and the above-mentioned access signal.

Seven press button switches 1 to 7 are provided for actuating the transmitter TX, each switch being associated with a respective one of the command signals. The switches 1 to 7 are connected to respective inputs of a decimal/binary converter DB whose outputs are connected to the transmitter TX.

A further press button switch, switch A, is provided for use in transmitting the access signal. Switch A is directly connected to an enabling input of the transmitter TX, to a clock pulse generator CPG, to a transistor TR2, and to delay circuit DC. The generator CPG is coupled to a ring counter RC which has three outputs connected to a patch plug P1. From the patch plug P1 there are seven outputs to respective further inputs to the decimal/binary converter DB. An output from the delay circuit DC is coupled to a transistor TR1 associated with the transmitter TX.

An output from the transmitter TX is connected via a two stage low pass filter F1 and F2 to an acoustic transducer TD.

Referring now in more detail to FIG. 1, the transmitter TX is a type FX207 circuit which is adapted, when actuated appropriately, to generate eight different groups of pulses, each group containing three pulses and each pulse having a frequency which is one of three predetermined frequencies. One particular frequency is common to each of the eight groups of pulses. In the present device seven of the eight groups are used as respective command signals. The access signal is made up of a sequence of three groups of pulses.

As shown in FIG. 1, the transmitter TX has sixteen pins. Of these sixteen pins, pin 1 is connected to a positive line, which in turn is connected via a main switch S1 to a battery (not shown). Pin 8 is connected to a negative line. Pins 2 to 7 are connected to components which determine the frequency of the various pulses generated by transmitter TX. Thus, pins 3 and 4 are connected via respective capacitors C3 and C2 to the positive line, pins 5 and 7 are connected via respective resistors R20 and R21 to the negative line, and terminal 2 is connected to a variable resistor VR1, which is connected in series with resistors R17 and R22 between the positive and negative supply lines and is used for the fine adjustment of the frequencies. Pin 6 is connected to the negative line via resistors R18 and R19 and the junction between these resistors is connected to the collector of above-mentioned transistor TR1. The emitter of transistor TR1 is connected to the negative line and the base to an output from the delay circuit DC. As hereinafter described, one of the three frequencies associated with transmitter TX is varied according to whether transistor TR1 is conductive or non-conductive.

Of the remaining pins of transmitter TX, pins 9, 10 and 11 are connected to respective outputs *a*, *b* and *c* from the decimal/binary converter DB, pin 12 to the junction between a resistor R23 and a capacitor C4, which determine the length of pulses generated by the transmitter, and pin 13 to an enabling output *d* from the converter DB. Pin 14 is directly connected to the access switch A and pin 15 to the junction between a capacitor C5 and a resistor R24, which determine the period between successive groups of pulses in each of the command signals. This period is 200 ms. Pin 16 is connected to the filters F1 and F2.

When the access switch A is not depressed the transistor TR1 conducts and the frequencies of the three pulses which can be generated by transmitter IC3 and $fa = 132$ Hz, $fc = 1443$ Hz and $fb = 1765$ Hz. The frequencies of respective pulses within the group of thres pulses generated at one time are than determined by the logic conditions represented by the voltages applied to pins 9, 10 and 11 of transmitter TX from the decimal/binary converter DB. Each pin can be in a logic 0 or 1 condition, giving eight possible binary codings and eight possible combinations of frequencies in the group of pulses. For example, a logic 0 condition at each of pins 9, 10 and 11 may give a group of pulses having frequencies $fa$, $fb$ and $fa$, respectively. Logic 0 conditions at pins 9, and 10 and a logic 1 condition at pin 11 may give frequencies $fb$, $fc$ and $fa$. The logic conditions at pins 9, 10 and 11 are of course determined by the voltages at outputs $a$, $b$ and $c$ of the decimal/binary converter DB.

When the access switch A is open the delay circuit DC applies a voltage to the base of transistor TR1 which cuts off the transistor. The second frequency generated by transmitter TX is then changed from $fb$ to $fb^1$, which is equal to 1573 Hz.

The duration of each pulse generated by transmitter TX, determined by capacitor C4 and resistor R23 as mentioned above, is 30.5 ms. The duration of each group of pulses is therefore 91.5 ms. When the access switch A is depressed and an access signal is generated the period between successive groups of pulses is 304 ms, determined by two periods of the clock pulse generator CPG. One complete cycle of the access signal therefore extends over approximately 1.36 seconds.

Each of the seven switches 1 to 7 has one pole thereof coupled to a respective one of seven inputs to the decimal/binary converter DB. The other pole of each switch is connected to the above-mentioned battery. Scitches 1 to 7 are infact controls for effecting respective "erase," "rewind," "text change," "text record," "play," "fast forward" and "remote" operations at the remote telephone answering machine.

The decimal/binary converter DB includes gating circuits which are adapted, when one of the switches 1 to 7 is closed, to cause logic conditions associated with that switch to appear on the three outputs $a$, $b$ and $c$ which are connected to pins 9, 10 and 11 of the transmitter TX. A logic 1 condition appears on the further output $d$ which is connected to the pin 13 of the transmitter.

The clock pulse generator CPG has an output coupled to an input of the ring counter RC, which has eight outputs. In use, the period of the generator CPG is set at 170 ms. and a positive pulse of 170 ms. duration is then produced at each of the eight outputs of the ring counter RC in turn. Connection is made from the third, fifth and seventh outputs of the counter RC to respective inputs of the dual, in-line patching plug P1. A resetting input to the ring counter RC is connected to the collector of a transistor TR2 whose base is connected to the line between the access switch A and the pin 14 of transmitter TX.

The patching plug P1 has seven outputs which are connected to the decimal/binary converter DB. Each output from the plug P1 is connected, within the converter DB, to a lead between a respective one of the switches 1 to 7 and the gating circuits. The appearance of a logic 1 condition at an output from the plug P1 produces therefore a set of logic conditions at the outputs $a$, $b$ and $c$ from the converter DB which is the same as the set of logic conditions produced by operation of the associated switch.

In practice, only three of the seven outputs from the plug P1 are connected to an input to the plug. These three ouputs are selected, for each coder, to produce a set of logic conditions which are associated with that coder and with the decoder in the associated telephone answering machine, as hereinafter described. The possibility of selecting a predetermined three outputs from the seven outputs available means that 210 coders, each associated with a different set of logic conditions, can be produced. Coders for use with the same answering machine are of course designed to generate the same set of logic conditions.

As indicated above and as hereinafter described, the decoder device in the telephone answering machine is normally in a latched condition wherein access of control signals is prevented until an access signal is received from the coder device. The operation of the coder device will now be described before the construction and operation of the decoder is discussed.

Referring again to FIG. 1, a remote caller, usually the owner of the associated telephone answering machine, transmits an access signal by depressing the acess switch A. This causes a voltage corresponding to a logic 1 condition to be applied from the battery to pin 14 of the transmitter TX, the delay circuit DC, the transistor TR2 and to the generator CPG.

The application of the logic 1 condition to pin 14 causes the transmitter TX to operate in a on-cyclic mode. The logic 1 condition applied to the delay circuit DC causes this circuit to apply a voltage which cuts off transistor TR1, thereby ensuring that the transmitter TX, when operated, will generate pulses of frequency $fb^1$ rather than $fb$. The voltage is applied to transistor TR1 for a time sufficient to complete transmission which has already been initiated when the access switch is released. The logic 1 applied to transistor TR2 causes the transistor to be cut off to apply a logic 1 enabling voltage to the ring counter RC. Finally, the logic 1 condition applied to the generator CPG causes the generator to supply pulses to the ring counter RC.

As described above, pulses are now produced sequentially at each of the eight outputs of the counter RC in turn. The oulses at the third, fifth and seventh outputs of the counter RC are applied via the patching plug P1 to three predetermined leads in the decimal/binary converter DB.

Each time there is a pulse on one of these leads a predetermined set of logic conditions associated with that lead, and hence with that one of the control switches connected to that lead, appears at the outputs $a$, $b$ and $c$ of converter DB. These logic conditions are applied to the pins 9, 10 and 11, respectively, of the transmitter TX. At the output pin 16 of the transmitter TX there appears a group of three pulses, each having a frequency of $fa$, $fb^1$ or $fc$.

In the result, three groups of pulses, which together form an access signal, are provided at the pin 16 of the transmitter TX. The groups of pulses are applied to the transducer TD via the low pass filters F1 and F2. They are transmitted to the distant telephone answering machine by the caller holding the transducer TD close to the mouthpiece of his telephone.

Assuming that the various frequencies in the access form the coding associated with the distant machine, the machine transmits a predetermined acknowledgement tone back to the caller. This tells him that he has obtained access to the machine and that control signals can now be transmitted.

Control signals are generated by depressing the appropriate one of the control switches 1 to 7 at the input to the converter DB.

A set of logic conditions associated with that control is then established at the outputs $a$, $b$ and $c$ of the converter and applied to pins 9, 10 and 11, respectively, of the transmitter TX. An enabling logic 1 condition is also applied from terminal $d$ of the converter DB to pin 13 of the transmitter. In the result, a command signal made up of a single group of three pulses, each having a frequency of $fa$, $fb$ or $fc$, repeated at 200 ms. intervals, is generated at the pin 16 of transmitter TX and is applied to the telephone line via low pass filters F1 and F2 and the transducer TD. The signals are decoded in the decoder of the distant telephone answering machine, as hereinafter described, and cause the appropriate mechanism therein to be operated. An acknowledgement tone is transmitted from the receiver after every command signal.

Figure 2:
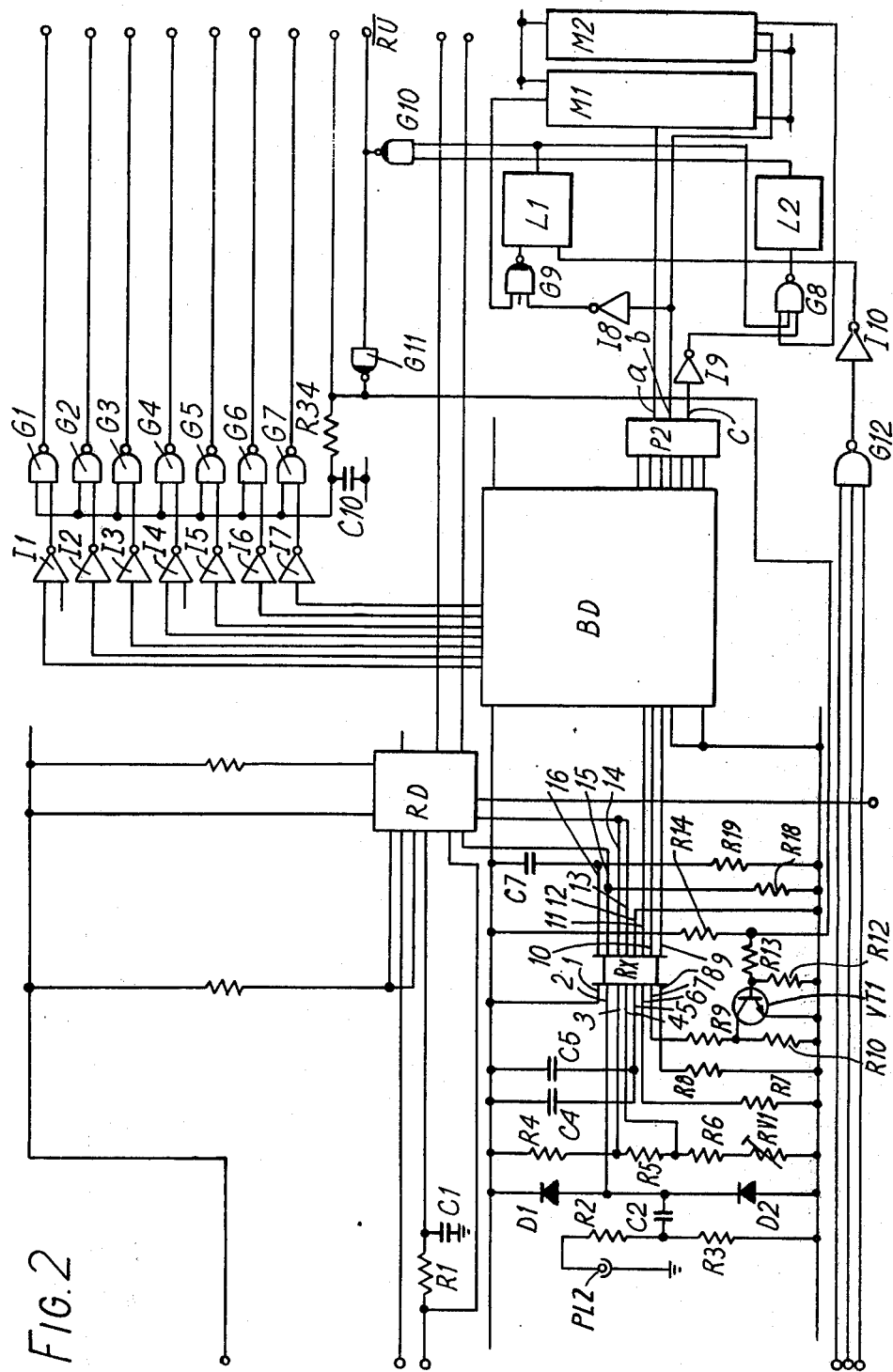
FIG. 2 is a decoder device in the telephone answering machine remotely controlled by the coder device of FIG. 1.

Referring now to FIG. 2 of the drawings, the decoder at the remote telephone answering machine includes a multicode receiver RX which is adapted to decode a predetermined access signal from a coder associated with the decoder and to generate a binary coded signal representing the access signal. Subsequently, the receiver RX likewise decodes and generates binary coded signals representing control signals from the coder.

The receiver RX has three outputs connected to a binary/decimal converter BD which in turn has seven outputs connected to a patching plug P2. The outputs from the converter BD are also connected to a gating network containing respective NAND gates G1 to G7, each having an associated inverter I1 to I7.

Connected to the outputs from the plug is an unlocking circuit containing gates G8, G9, first and second latching circuits L1, L2, monostables M1, M2, a further gate G10 and a gate G11, whose output is connected to a second input of each of the gates G1 to G7.

Referring now in more detal to FIG. 2, the receiver RX is a type FX307 device adapted, when supplied with an input signal formed of a group of three pulses, each of a predetermined frequency, to provide a set of logic conditions at respective outputs thereof which represent that input signal in binary coded form.

The receiver RX has 16 pins 1 to 16. Pin 1 is connected to a positive line from a 12 V supply and pin 12 to a negative line from the supply. Pins 3 and 4 are connected to respective opposite ends of a resistor R5, which is connected in series with resistors R4 and R6 and with a variable resistor RV1. Resistors R4, R5 and R6 and variable resistor RV1 determine the bandwidth within which the receiver RX operates, fine tuning of the bandwidth being effected by varying RV1. Pin 5 is connected to the positive line via a parallel circuit made up of capacitors C4 and C5, pin 6 is connected to the negative line via a resistor R7, pin 7 is connected to the negative line via resistors R9 and R10, and pin 8 to the negative line via a resistor R8. These capacitors C4 and C5, resistors R7, R8, R9 and R10 and a transistor VT1, which is connected to the junction between resistors R9 and R10, and determine the frequencies to which the receiver RX is responsive. When the transistor VT1 is cut off these frequencies are the above-mentioned frequencies $fa$, $fb^1$ and $fc$. When transistor VT1 conducts the frequencies are $fa$, $fb$ and $fc$. Pin 2 of receiver RX is an input pin connected to an audio input plug PL2. Pins 9, 10 and 11 are output pins connected to the binary/decimal converter BD. It is on pins 9, 10 and 11 that logic 1 or 0 conditions representing the input to the receiver appear. Pin 15 is connected to a monostable which serves as a delay circuit and has an output to pins 13 and 14 of receiver RX. Pin 16 is connected to the junction between capacitor C7 and resistor R19 and serve to determine the gate period for receiver RX.

The binary/decimal converter BD has seven outputs connected to respective inputs of the patching plug P2, as indicated above. When logic conditions representing a binary code are supplied to the inputs of converter BD an output voltage is provided on a respective one of the seven outputs represented by that code.

Within the patching plug P2 connections are made from a predetermined three of the seven inputs to respective outputs from the plug. Each of these three inputs is associated with a set of logic conditions from the receiver RX which corresponds to one of the sets of logic conditions established at the outputs $a$, $b$ and $c$ of converter DB when the access switch A in the coder is depressed.

A first output $a$ from the patching plug P2 is connected to the monostable circuit M1, whose output is connected to a first input of the NAND gate G9. A second output $b$ from the plug P2 is connected to a second input of the gate G9 via an inverter I8 and to the second monostable circuit M2. An output from circuit M2 is connected to a first input of the NAND-gate G8. Finally, a thid output $c$ from the plug P2 is connected to a third input of the gate G8 via an inverter I9.

An output from the NAND gate G9 is connected to the latching circuit L1 and the output of this circuit is in turn connected to a second input of the gate G8. The output from the circuit L1 is also connected to a first input to the NAND gate G10.

An output from the NAND gate G8 is connected to the second latching circuit L2 and the output of this circuit is connected to a second input of the gate G10.

From the output of the gate G10 connections are made to the reset delay circuit RD and to NAND gate G11. An output of gate G11 is connected via an integrator C10, R34 to a second input of each of the gates G1 to G7 and to the base of transistor Vt1 via resistor R13 associated with the receiver RX.

Each of the latching circuits L1 and L2 has an enable input via an inverter I10 and a gate G12 to the output of a circuit (not shown) for detecting looping of the telephone line.

When the decoder is in a standby or locked condition the transisitr VT1 is cut off and the receiver RX is then sensitive to the frequencies $fa$, $fb^1$ and $fc$, as described above. Each of the latching circuits L1, L2 is locked in a reset condition owning to the fact that the telephone line is unlooped.

When a caller dials the number of the extension to which the telephone answering machine and decoder are connected, the telephone line is looped and the locking voltage is removed from the latching circuits L1 and L2.

If an access signal consisting of three groups of pulses, each containing three pulses, is now transmitted by the caller the signal is applied to pin 2 of the receiver RX.

For each group of pulses a predetermined set of logic conditions is established at pin 9, 10 and 11 of the receiver RX and is applied to the binary decimal converter BD. Each set of logic conditions produce an output voltage on a respective one of the outputs from the converter BD and this output voltage is applied to the patching plug P2. Output voltages are therefore applied in sequence to three of the inputs to the plug P2 as a result of the arrival of the access signal.

As soon as a group of pulses is received by the receiver RX a code-received pulse is generated at pin 15 and applied to the reset delay circuit RD. The circuit RD applies a reset signal to pins 13 and 14 of the receiver RX after a delay of 22 ms. This reset signal cancels the group code previously set in the receiver RX.

The first output voltage from the plug P2 appears on the output $a$ and is applied to the monostable N1. The monostable M1 then supplies a logic 1 condition to the first input of gate G9 for a period of 435 ms.

The second output voltage from the plug P2 is applied from the output $b$ to the monostable M2 and is also applied via the inverter 18 to the second input gate G9. Assuming that the voltage at output $b$ was generated within 435 ms. of the voltage at output $a$, the gate G9 has a logic 1 condition at each input and its output therefore switches to a logic 0 condition. This sets the latch L1, which provides a logic 1 voltage to the first input of the gate G10 and to the first input of gate G8. Monostable M2 supplies a logic 1 voltage to the second input of gate G8.

The third putput voltage appears at pin C of the plug P2 and is applied via the inverter 19 to the third input of the gate G8. Assuming that the third output voltage occurred within 435 ms of the second output voltage, a logic 0 voltage appears at the output of the gate G8. This sets the latch L2, which supplies a logic 1 voltage to the second input of the gate G10. The output of the gate G10 goes to a logic 0 condition, which signifies that the receiver has been unlocked by the access signal.

The logic 0 condition at the output of gate G10 is first transmitted via an output terminal RU to a tone generator (not shown) in the telephone answering machine. An acknowledgement tone is then transmitted to the operator of the associated coder device. The logic 0 condition at the output of the gate G10 is inverted by the gate G11 and a logic 1 voltage is then applied to the base of transistor VT1, turning on the transistor and rendering the receiver RX receptive to the frequency $fb$ instead of $fb'$. Finally, the inverted output from the gate G10 is applied via the integrator C10, R34 to one input of each of the gates G1 to G7.

The decoder device is now unlocked in that it is in a condition where it can no longer receive an access signal, or part of an access signal, but can receive command signals. Such command signals are received by the receiver RX and applied via the converter BD to the appropriate one of the gates G1 to G7. From the gate a commandsignal is applied to the associated mechanism in the telephone answering machine.

We claim:

1. A decoder device for remotely controllable electrical equipment, the device comprising receiver means having a signal input, an output and a switching input, the receiver means being initially sensitive to a predetermined access signal comprising at least two groups of pulsed electrical signals, each group comprising at least two pulses and each pulse having a predetermined frequency different from the or each adjacent pulse in the same group, the receiver means being adapted, when the said access signal is applied to the signal input thereof, to generate a switching signal at the output thereof, and means for applying the switching signal to the switching input of the receiver means, whereby the receiver means are rendered sensitive to command signals subsequently applied thereto, each command signal comprising a group of at least two pulses, each pulse having a predetermined frequency different from the frequency of the or each adjacent pulse in the group and one pulse in the group having a frequency different from any of the frequencies in the access signal, the receiver means then being adapted, when one of the said command signals is applied thereto, to provide a predetermined output signal.

2. A decoder device as claimed in claim 1, wherein the receiver means are initially sensitive to an access signal comprising three groups of pulsed electrical signals each group comprising three pulses, and the switching signal renders the receiver means sensitive to command signals each comprising three pulses.

3. A decoder device as claimed in claim 2, wherein each group of pulses in the access signal includes a pulse whose frequency is the same as the frequency of one of the pulses in each of the other groups.

4. A decoder device as claimed in claim 2, wherein the receiver means comprise a receiver, means for applying the said access signal to the receiver, whereby the receiver generates an output signal each time one of the groups of pulsed electrical signals in the access signal is applied thereto, an unlocking circuit, means for applying the output signals from the receiver to the unlocking circuit, the unlocking circuit being switched to an enabled condition for a predetermined interval of time after receipt of each output signal and providing the said switching signal only if each output signal is received thereby in the said interval of time after receipt of the preceding output signal.

5. A decoder device as claimed in claim 4, wherein the output signal generated by the receiver after receipt of the second group of pulsed electrical signals so enable the unlocking circuit that, in the event that the third group does not arrive in the said predetermined interval of time after receipt of the second group, the said switching signal is in future generated whenever one of the said third groups arrives within the said predetermined interval of time after arrival of a second group.

6. A decoder as claimed in claim 1, comprising a gating circuit, and means for applying the switching signal to the gating circuit, whereby the gating circuit is enabled by the switching signal, and means for applying the or each predetermined output signal from the receiver means via the enabled gating circuit to an output of the device.

7. A decoder device as claimed in claim 6, wherein means are provided for coupling the receiver means to the associated electrical equipment so that the receiver means are inhibited and do not provide the predetermined output signal if one of the said command signals is applied to the device from the equipment.

8. A decoder device as claimed in claim 1, in combination with electrical equipment, wherein the said equipment includes means for generating an acknowledgement signal and, in use, the switching signal and the predetermined output signal are applied to the equipment and activate the generating means so that an acknowledgement signal is transmitted to a source of the said access and command signals.

9. A coder device for generating electrical signals for use in remotely controlling electrical equipment, the device comprising oscillator means adapted, when a coded input voltage is applied thereto, to generate an electrical signal or electrical signals of frequency determined by the coding of the input voltage, means for generating coded input voltages for the oscillator means, means coupling the generating means to the oscillator means, the generating means being adapted, when operated, to generate a predetermined sequence of coded input voltages, whereby the oscillator means generate an access signal for rendering the equipment accessible to subsequent control signals and comprising at least two groups of pulsed electrical signals, each group comprising at least two pulses and each pulse having a predetermined frequency different from the or each adjacent pulse in the same group, a series of further generating means each adapted, when operated by an associated control, to generate a coded input voltage associated with that control, and means coupling the further generating means to the oscillator means, whereby the oscillator means generate a coded command signal comprising a group of at least two pulses, each pulse having a predetermined frequency different from the or each adjacent pulse in the group and one pulse in the group having a frequency different from any of the frequencies in the access signal.

10. A coder device as claimed in claim 9, wherein the generating means, when actuated, cause the oscillator means to generate an access signal comprising three groups of pulsed electrical signals, and the further generating means, when actuated, cause the oscillator means to generate a command signal comprising three pulses.

11. A coder device as claimed in claim 10, wherein each group of pulses in the access signal includes a pulse whose frequency is the same as the frequency of the pulses in each of the other groups.

12. A coder device as claimed in claim 9, wherein the oscillator means is adapted to generate a group of pulsed electrical signals for each coded input voltage applied thereto from a generating means.

13. A coder device as claimed in claim 9, wherein the generating means associated with the access signal comprise a clock pulse generator and a gating network coupled to an output of the clock pulse generator, the network being adapted, when supplied with clock pulses by the clock pulse generator, to supply the said predetermined sequence of coded intput voltages to the oscillator means.

14. A coder device as claimed in claim 13, wherein the said gating network forms part of each further generating means.

* * * * *